United States Patent [19]

Babiec, Jr. et al.

[11] 4,090,988
[45] May 23, 1978

[54] POLYURETHANE FOAM PREPARATION USING PYRIDINE ETHER CATALYSTS

[75] Inventors: John S. Babiec, Jr., Orange; Steven T. Nakos, Wallingford; Stephen L. Goldstein, Cheshire, all of Conn.

[73] Assignee: Olin Corporation, New Haven, Conn.

[21] Appl. No.: 813,904

[22] Filed: Jul. 8, 1977

Related U.S. Application Data

[63] Continuation-in-part of Ser. No. 648,451, Jan. 12, 1976, Pat. No. 4,048,107.

[51] Int. Cl.² .............................................. C08G 18/20
[52] U.S. Cl. ........................ 260/2.5 AC; 260/77.5 AC
[58] Field of Search ................. 260/2.5 AC, 77.5 AC, 260/75 NC

[56] References Cited

U.S. PATENT DOCUMENTS

| | | | |
|---|---|---|---|
| 2,560,280 | 7/1951 | de Benneville | 260/567.6 |
| 2,683,147 | 7/1954 | Girod | 260/294.7 |
| 2,692,874 | 10/1954 | Langerak | 260/77.5 AC |
| 2,941,967 | 6/1960 | Moller | 260/2.5 AC |
| 2,957,832 | 10/1960 | Gmitter | 260/77.5 AC |
| 3,109,825 | 11/1963 | O'Mant | 260/77.5 AC |
| 3,330,782 | 7/1967 | Poppelsdorf | 260/2.5 AC |
| 3,478,096 | 11/1969 | Cyba | 260/563 |
| 3,535,328 | 10/1970 | Zielinski | 260/296 |
| 3,645,925 | 2/1972 | Speranza | 260/2.5 AC |
| 3,658,902 | 4/1972 | Bordenaca | 260/563 R |
| 3,660,319 | 5/1972 | Yeakey | 260/2.5 AC |
| 3,694,510 | 9/1972 | Moller | 260/2.5 AC |
| 3,775,376 | 11/1973 | Bircher | 260/77.5 AC |
| 3,786,005 | 1/1974 | Bechara | 260/2.5 AC |
| 3,786,029 | 1/1974 | Bechara | 260/2.5 AC |
| 3,890,255 | 6/1975 | van Leuwen | 260/2.5 AQ |
| 4,048,107 | 9/1977 | Babiec | 260/2.5 AC |

Primary Examiner—C. Warren Ivy
Attorney, Agent, or Firm—Robert J. Feltovic; Thomas P. O'Day; F. A. Iskander

[57] ABSTRACT

Selected amino ethers are disclosed for use as catalysts in the preparation of polyurethane foam.

14 Claims, No Drawings

POLYURETHANE FOAM PREPARATION USING PYRIDINE ETHER CATALYSTS

This application is a continuation-in-part of copending U.S. application Ser. No. 648,451, filed Jan. 12, 1976, now U.S. Pat. No. 4,048,107.

This invention relates to a select group of amine compounds and to their use as catalysts in the preparation of polyurethane foam.

The production of polyurethane foams is achieved by reacting organic polyisocyanates with active hydrogen-containing compounds in the presence of a foaming agent. Usually a catalyst is employed to effect or promote the reaction. It is known in this art that al tertiary amines exert some catalytic activity, although the level of such activity varies considerably depending on the particular tertiary amine that is used.

Further in this art, certain tertiary amines, containing aliphatically-bound oxygens in the molecule, have been identified for use in catalyzing the polyurethane foam-forming reaction. Various such catalysts are described in U.S. Pat. Nos. 2,941,967; 3,330,782; and 3,786,029. As pertain to the compounds disclosed herein, noteworthy of these prior art catalysts are 1,2-(2-dimethylaminoethoxy)ethane, 1,1,1-tris(2-dimethylaminoethoxy)ethane, and bis(2-dimethylaminoethyl)ether. The latter material has been widely used in the commercial production of polyurethanes.

See also U.S. Pat. No. 2,560,280, which discloses various formals, including for example bis(2-dimethylaminoethoxy)methane, for use as intermediates in the preparation of bactericides; and U.S. Pat. No. 3,535,328 which discloses certain aminoalkoxy pyridines, such as 2,6-di(2-dimethylaminoethoxy)pyridine, for use as pesticides.

It is a primary object of the invention to provide a new group of amine catalysts for use in the production of polyurethane foam. A specific object is to provide selected catalysts which have been found to be highly effective in promoting the polyurethane foam-forming reaction.

The achievement of the above objects according to the invention is based on the discovery of selected amino ethers as identified in more detail hereinbelow, which are generally encompassed by the formula:

$$(R_2NR'O)_mZ(OR'NR_2)_2 \qquad \text{I}$$

wherein
R is methyl, ethyl, or the radical $NR_2$ is morpholino,
R' is an alkylene radical of 2 to 4 carbon atoms,
m is 0 or 2, and
Z is a hydrocarbon radical of 1-12 carbon atoms.

Further according to the invention, these amino ethers are used as catalysts in the production of polyurethane foam.

The preferred compounds encompassed by Formula I are those in which m is 0. Illustrative such ethers include:
bis(1-dimethylamino-2-propoxy)methane
1,6-bis(2-dimethylaminoethoxy)hexane
α,α'-bis(2-dimethylaminoethoxy)-p-xylene
bis(3-dimethylamino-1-propoxy)methane
bis(2-diethylaminoethoxy)methane
bis(2-N-morpholinoethoxy)methane
2,2-bis(2-dimethylaminoethoxy)propane
α,α'-bis(2-dimethylaminoethoxy)toluene
1,1-bis(2-dimethylaminoethoxy)butane
the 2,4- and 2,6-bis(dimethylaminoethoxy) pyridines
the 2,4- and 2,6-bis(dimethylaminopropoxy) pyridines
the 2,4- and 2,6-bis(diethylaminoethoxy) pyridines A particularly preferred group of amino ethers for use according to the invention are those of Formula I wherein m is 0 and Z is pyridine or a substituted pyridine. These compounds are represented by the formula:

$$Z(OR'NR_2)_2 \qquad \text{II}$$

wherein Z, R', and R have the significance indicated above. These ethers have been found to exhibit high catalytic activity in promoting the polyurethane foam-forming reaction.

As indicated above with reference to Formula II, the radical Z can be pyridine or a substituted pyridine. The latter includes for example alkyl substituents having 1-12, and preferably 1-4, carbon atoms, aryl substituents having 6-12 carbon atoms and mixtures thereof.

Illustrations of the preferred ethers represented by Formula II include the following:
2,6-bis(2-dimethylaminoethoxy)pyridine
2,4-bis(2-dimethylaminoethoxy)pyridine
2,6-bis(1-dimethylamino-2-propoxy)pyridine
2,6-bis(3-dimethylamino-1-propoxy)pyridine
2,4-bis(3-dimethylamino-1-propoxy)pyridine
2,6-bis(2-diethylaminoethoxy)pyridine
2,4-bis(2-diethylaminoethoxy)pyridine
2,6-bis(1-diethylamino-2-propoxy)pyridine
2,6-bis(4-dimethylamino-1-butoxy)pyridine
2,6-bis(2-N-morpholinoethoxy)pyridine
2,6-bis(2-dimethylaminoethoxy)-4-methylpyridine
2,6-bis(2-dimethylaminoethoxy)-4-phenyl pyridine Within the class of ethers encompassed by Formula II, especially preferred are those ethers in which Z is an unsubstituted pyridine moiety such as represented by the formula:

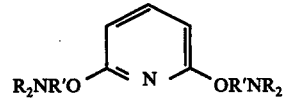

III wherein R and R' have the significance indicated above. And the most preferred ethers are those of Formula III in which R is methyl.

The amino ether catalysts of the invention can be prepared by a two-step process. The first step is a conventional reaction wherein an amino alcohol is reacted with an alkali metal hydroxide to form the corresponding alkali metal alcoholate intermediate. The reaction is carried out at about 110° C and preferably in the presence of an organic solvent such as toluene, by-product water being azeotroped off with part of the solvent. The second step is a Williamson synthesis type reaction wherein the alkali metal alcoholate in toluene is reacted for example with dichloropyridine or alkyl or aryl substituted dichloropyridine. The reaction is effected at about 90°-130° C and preferably under reflux. By-product alkali metal halide is then removed by conventional methods, e.g., filtration, and final recovery of the amino ether product is achieved by distillation. The two reactions are represented by the following equations, wherein R, R' and Z have the significance indicated above.

Pursuant to the process of the invention, the amino ethers described herein are used as catalysts in the preparation of polyurethane foams. Either the one-shot method or the prepolymer technique may be employed in preparing the foam which may be flexible, rigid or semi-rigid. The foam is prepared from a reaction mixture comprising, in addition to the amino ether catalyst, as described above, a compound having at least two active hydrogens in the molecule, an organic polyisocyanate, and a foaming agent. A variety of such reactants, including mixtures thereof, are known in the art. For example, illustrative organic polyisocyanates include toluene diisocyanate, such as the 4:1 and 65:35 mixtures of the 2,4- and 2,6-isomers, methylene-bis(phenylisocyanate), 1,5-naphthalene diisocyanate, 1,3-phenylene diisocyanate, the xylylene diisocyanates, 3,3'-bitoluene diisocyanate, the polymethylene polyphenylisocyanates, hexamethylene diisocyanate, propylene diisocyanate, mixtures thereof and the like. In practice, certain aliphatic-aromatic polyisocyanates, such as toluene diisocyanate, methylene bis(phenylisocyanate), the polymethylene polyphenylisocyanates and mixtures thereof are preferred due to the fact that these materials are readily available commercially and have gained wide acceptance for use in the production of polyurethane foam.

The compound having at least two active hydrogens in the molecule can be any such material, including mixtures thereof, which reacts with polyisocyanates to form polyurethanes. Illustrative are the polyols, including the polyester polyols and the polyether polyols as taught by the prior art. In general, the use of polyether polyols is preferred.

The polyether polyols include for example oxyalkylated polyhydric alcohols and mixtures thereof. These oxyalkylated polyhydric alcohols usually have 2-8 hydroxyl groups and a molecular weight ranging from about 200 to about 10,000 and preferably about 250-8,000. The oxyalkylated polyhydric alcohols are generally prepared by methods well-known in the art such as reacting, in the presence of an oxyalkylation catalyst, a polyhydric alcohol and an alkylene oxide such as ethylene oxide, propylene oxide, butylene oxide, amylene oxide, epichlorohydrin, and mixtures of these alkylene oxides, using either random or step-wise addition.

Polyhydric alcohols suitable for use in preparing the polyether polyols include for example ethylene glycol, propylene glycol, 2,3-butylene glycol, 1,3-butylene glycol, 1,5-pentane diol, 1,6-hexane diol, glycerol, trimethylolpropane, pentaerythritol, sorbitol, methyl glucoside, sucrose, dextrose, mixtures thereof and the like. If desired a portion of the polyhydric alcohol may be replaced with another compound having at least two reactive hydrogen atoms, such as alkyl amines, alkylene polyamines, alkanolamines, cyclic amines, amides, and polycarboxylic acids. Mixtures of oxyalkylated polyhydric alcohols are also suitable for use in the process of this invention.

Although as indicated above, the polyurethane foams of the invention can be flexible, semi-rigid, or rigid, the flexible foams are preferred. Such foams are obtained utilizing polyols which range in molecular weight from about 2,000 to about 7,000 and still more preferably from about 2,500 to about 6,000.

Such relative proportions of organic polyisocyanate and polyol are used as to provide at least about 0.7, and preferably about 0.9-1.20, NCO groups per every OH group which is present in the foam-forming reaction mixture.

The polyurethane foams are prepared in the presence of a foaming agent which may be any of those known to be useful for this purpose. Illustrative are water and the organic foaming agents containing up to about seven carbon atoms such as the halogenated hydrocarbons, lower molecular weight alkanes, alkenes, ethers, and mixtures thereof. In general, water and the halogenated hydrocarbons are the preferred foaming agents. Typical halogenated hydrocarbons include, for example, monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. The amount of foaming agent employed may be varied within a wide range. For illustration, the halogenated hydrocarbons may be employed in an amount from about 1 to about 50, and preferably about 5-35, parts per 100 parts by weight of the polyol; and water may be employed in an amount from about 1.0 to about 6.0 parts per 100 parts by weight of the polyol. In the preparation of flexible foams pursuant to the preferred embodiment of the invention, desirably a foaming agent comprised of water is employed.

It is preferred in the preparation of the polyurethane foams of the present invention to employ minor amounts of a conventional surfactant in order to improve the cell structure of the polyurethane foam. Typical of such surfactants are the silicones, and the siloxaneoxyalkylene block copolymers. U.S. Pat. No. 2,834,748 and T. H. Ferrigno, *Rigid Plastic Foams* (New York: Reinhold Publishing Corp., 1963) pages 38-42, disclose various surfactants which are useful for this purpose. Generally up to 2 parts by weight of the surfactants are employed per 100 parts of the polyol.

If desired, the foam-forming reaction mixture may include additional ingredients which serve a certain function or impart a specific property to the foam. This includes, for example, fillers, colorants, plasticizers, fire-retardant additives, and so forth.

In carrying out the polyurethane foam-forming reaction, the amino ether catalysts of the invention may be used alone, i.e., as the sole catalysts, or in combination with other catalysts. In practice the use of a metallic co-catalyst is prescribed when preparing flexible foams, whereas such co-catalysts are generally unnecessary when preparing rigid foams. The metallic co-catalysts include, for example, the organo-tin compounds. U.S. Pat. No. 3,330,782 which issued to F. Poppelsdorf on July 11, 1967 describes various such organo-tin catalysts. The entire disclosure of this Poppelsdorf patent is incorporated herein by reference. Particularly preferred organo-tin catalysts for use herein are the stannous salts such as stannous octoate, stannous laurate, stannous oleate, stannous acetate and the like, stannous octoate being most preferred.

The catalyst, be it a single amino ether as disclosed herein or a combination thereof with other catalysts, may be used in any suitable proportion which is effective in catalyzing the polyurethane foam-forming reaction. Thus the term "catalytic proportion," as used in the specification and claims herein, is intended to encompass any such proportion. For illustration, the catalytic proportion may range from about 0.01 to about 6, and more commonly about 0.05–3, parts per every 100 parts by weight of the polyol.

Polyurethane foams prepared by the process of the invention are of utility in a wide range of industrial and commercial applications. For example, the flexible foams are useful in various cushioning and similar application such as the production of carpet underlays, seat cushions, mattresses, gaskets, and so forth. Similarly the rigid polyurethane foams find utility in various insulation and structural applications.

The following examples are provided to illustrate the invention. In these examples, all parts and percentages are by weight unless otherwise specified. Example I illustrates the two-step method for preparing the amino ether catalysts of the invention; whereas the remaining examples are directed to the preparation of polyurethane foam using various amino ether catalysts.

EXAMPLE I 2,6-bis(2-dimethylaminoethoxy)pyridine

The amount of 29.6 grams of sodium was added and mixed with a solution of 150 grams (1.68 moles) of 2-dimethylaminoethanol in 300 mls. of toluene. The mixture was refluxed until all the sodium was reacted with the 2-dimethylaminoethanol, forming sodium 2-dimethylaminoethoxide. The system was then cooled to 50° C and 95.2 grams of powdered 2,6-dichloropyridine were added gradually and mixed in. The mixture was heated slowly at first, followed by a 16-hour reflux. After cooling and subsequent removal of precipitated sodium chloride by filtration, the filtrate was stripped of solvent. 133 grams of a yellowish liquid product, namely 2,6-bis(2-dimethylaminoethoxy)pyridine were then recovered by distillation at 105°–109° C and 0.1 m.m. of mercury. The structure of the product was confirmed by nuclear magnetic resonance (NMR).

EXAMPLE II

A flexible, polyurethane foam was prepared from the ingredients described below which included 0.12 parts (1.08 amine equivalent) of 2,6-bis(2-dimethylaminoethoxy)pyridine catalyst.

| Ingredients | Parts by weight |
|---|---|
| Oxypropylated glycerin, mol. wt. 3,000 | 100.0 |
| Toluene diisocyanate (80/20 mixture of 2,4-/2,6-isomers) | 49.6 |
| Water | 2.5 |
| Stannous octoate | 0.2 |
| 2,6-bis(2-dimethylaminoethoxy)-pyridine | 0.12 |
| Silicon Surfactant (Dow Corning-192) | 1.5 |

The above mixture was hand mixed at room temperature and immediately poured into an open-top, square cardboard box. Using a stop-watch, the "cream-time," "rise time" and "gel time" were measured, all being from the moment the mixture is placed into the box. The "cream time" is the time elapsed, up to the point when foaming commences, during which the mixture is transformed from a liquid to a cream or emulsion. The "rise-time" is the time elapsed for completion of the foaming reaction or expansion of the foam. This is usually evidenced by the appearance of gas bubbles on the surface of the foam. The "gel time" is the time elapsed for the resulting foam to become a self-supporting body as evidenced by the foam exhibiting resistance to being penetrated by a dull instrument. The results of these measurements are provided in Table I below.

On visual examination, the foam had a regular or uniform cell structure.

EXAMPLES III - XV

In these examples, the identical procedure of Example II was followed except for variations in the amino ether catalyst used. Thus instead of 0.12 gram of 2,6-bis(2-dimethylaminoethoxy)pyridine, the following ethers were used in the indicated proportions.

Ex. 3: bis(1-dimethylamino-2-propoxy)methane—0.10 part (1.05 amine equiv.).

Ex. 4: 1,6-bis(2-dimethylaminoethoxy)hexane—0.11 part (0.97 amine equiv.).

Ex. 5: α,α'-bis(2-dimethylaminoethoxy)-p-xylene—0.18 part (1.47 amine equiv.).

Ex. 6: bis(3-dimethylaminopropoxy)methane—0.10 part (1.05 amine equiv.).

Ex. 7: bis(2-dimethylaminoethoxy)methane—0.07 part (0.84 amine equiv.).

Ex. 8: 2,6-bis(1-dimethylamino-2-propoxy)-pyridine—0.17 part (1.42 amine equiv.).

Ex. 9: 2,6-bis(3-dimethylaminopropoxy)-pyridine—0.13 part (1.10 amine equiv.).

Ex. 10: bis(2-diethylaminoethoxy)methane—0.15 part (1.44 amine equiv.).

Ex. 11: bis(2-N-morpholinoethoxy)methane—0.25 part (2.08 amine equiv.).

Ex. 12: 1,1-bis(2-dimethylaminoethoxy)-propane—0.11 part (1.15 amine equiv.).

Ex. 13: α,α'-bis(2-dimethylaminoethoxy)-toluene—0.13 part (1.12 amine equiv.).

Ex. 14: 1,1- bis(2-dimethylaminoethoxy)ethane—0.09 part (1.00 amine equiv.).

Ex. 15: 1,1,2,2-tetrakis(2-dimethylaminoethoxy)ethane—0.12 part (1.45 amine equiv.).

In the case of each of Examples 3–15, the resulting foam was a wholesome product having a regular cell structure. The results of the time measurements for these examples are provided in Table I below.

TABLE I

| Example No. | Time Measurement (sec.) | | |
|---|---|---|---|
| | Cream | Rise | Gel |
| 2 | 10 | 129 | 138 |
| 3 | 12 | 147 | 152 |
| 4 | 12 | 148 | 156 |
| 5 | 11 | 155 | 162 |
| 6 | 10 | 135 | 142 |
| 7 | 10 | 138 | 148 |
| 8 | 10 | 141 | 154 |
| 9 | 10 | 143 | 153 |
| 10 | 10 | 131 | 140 |
| 11 | 12 | 178 | 190 |
| 12 | 11 | 139 | 148 |
| 13 | 11 | 145 | 154 |
| 14 | 11 | 124 | 138 |
| 15 | 11 | 135 | 146 |

What is claimed is:

1. A process for preparing a polyurethane foam from a reaction mixture which comprises an organic polyisocyanate, a polyol, a foaming agent and a catalytic proportion of an amino ether having the formula:

$$Z(OR'NR_2)_2$$

wherein

Z is unsubstituted pyridine or a substituted pyridine, the substituents being selected from the group consisting of alkyl having 1-12 carbon atoms, aryl having 6-12 carbon atoms and mixtures thereof, R is methyl, ethyl, or the radical $NR_2$ is morpholino, and R' is an alkylene radical of 2 to 4 carbon atoms.

2. The process of claim 1 wherein Z is unsubstituted pyridine.

3. The process of claim 2 wherein R is methyl.

4. The process of claim 3 wherein said amino ether is 2,6-bis(2-dimethylaminoethoxy)pyridine.

5. The process of claim 1 wherein said polyol is a polyether polyol.

6. The process of claim 5 wherein said foam is flexible, said foaming agent is comprised of water, and said reaction mixture also comprises a metallic co-catalyst.

7. The process of claim 6 wherein said metallic co-catalyst is an organo-tin compound.

8. The process of claim 7 wherein Z is unsubstituted pyridine.

9. The process of claim 8 wherein said polyether polyol is comprised of an oxylakylated polyhydric alcohol having a molecular weight of about 2,500–6,000.

10. The process of claim 9 wherein said mixture also comprises a surfactant.

11. The process of claim 10 wherein said organic polyisocyanate is toluene diisocyanate.

12. The process of claim 11 wherein R is methyl.

13. The process of claim 12 wherein said amino ether is selected from the group consisting of 2,6-bis(2-dimethylaminoethoxy)pyridine, 2,6-bis(1-dimethylamino-2-propoxy)pyridine and 2,6-bis(3-dimethylamino-1-propoxy)pyridine.

14. The process of claim 13 wherein said oxyalkylated polyhydric alcohol is oxypropylated glycerin and said organo-tin compound is stannous octoate.

* * * * *